United States Patent [19]

Adlhart

[11] 4,175,165
[45] Nov. 20, 1979

[54] FUEL CELL SYSTEM UTILIZING ION EXCHANGE MEMBRANES AND BIPOLAR PLATES

[75] Inventor: Otto J. Adlhart, Newark, N.J.

[73] Assignee: Engelhard Minerals & Chemicals Corporation, Iselin, N.J.

[21] Appl. No.: 817,455

[22] Filed: Jul. 20, 1977

[51] Int. Cl.² ............................................. H01M 8/04
[52] U.S. Cl. ....................................... 429/30; 429/33; 429/39; 29/623.1
[58] Field of Search ........................ 429/30, 31, 32, 33, 429/38, 39

[56] References Cited

U.S. PATENT DOCUMENTS

| | | | |
|---|---|---|---|
| 3,012,086 | 12/1961 | Vahldreck | 429/30 |
| 3,134,696 | 5/1964 | Douglas et al. | 429/30 |
| 3,188,242 | 6/1965 | Kordesch et al. | 429/38 |
| 3,497,389 | 2/1970 | Berger et al. | 429/33 |

*Primary Examiner*—Anthony Skapars

[57] ABSTRACT

Fuel cell assemblies and methods for manufacturing same are disclosed, the fuel cell assemblies comprising a stacked configuration of fuel cell laminates, each including a catalytic fuel electrode, a catalytic oxygen electrode, and an electrolyte therebetween the electrolyte comprising an ion exchange membrane, bipolar plates separating each laminate so that the opposite surfaces of each bipolar plate contacts the fuel and oxygen electrodes, respectively, fuel gas flow channel in the bipolar plate for supplying fuel to the fuel electrodes, and oxygen gas flow channels in the bipolar plates for supplying oxygen-containing gas to the oxygen electrodes, the fuel and oxygen gas flow channels being substantially perpendicular to each other. In a preferred embodiment a particular perfluorosulfonic acid membrane is employed as the electrolyte, the surfaces of the bipolar plates are treated so as to render them hydrophillic, so that water produced in the cell can be collected at the edges thereof, and the configuration of the bipolar plates is such that the diffusion paths for the oxygen-containing gas is as short as practical.

The method disclosed for manufacturing such fuel cell assemblies comprises preparing the fuel cell laminates by bonding catalytic fuel electrodes and catalytic oxygen electrodes to opposite surfaces of an electrolyte member comprising an ion exchange membrane, and stacking the laminates alternatingly with the bipolar plates described above so that the plates contact fuel and oxygen electrodes on the opposite surfaces thereof, and providing means for collecting current from the top and bottom of the stacked configuration.

32 Claims, 5 Drawing Figures

FUEL CELL SYSTEM UTILIZING ION EXCHANGE MEMBRANES AND BIPOLAR PLATES

FIELD OF THE INVENTION

The invention herein described was made in the course of work under contract DAAG53-76-C-0130 with the United States Department of the Army.

The present invention relates to an apparatus comprising a fuel cell assembly arranged in a stacked configuration. Still more particularly the present invention relates to fuel cell assemblies employing ion exchange membranes as the electrolytes therein. Still more particularly, the present invention relates to improvements in fuel cell assemblies and methods for manufacturing same whereby such assemblies employing bipolar plates in a stacked configuration are utilized.

BACKGROUND OF THE INVENTION

It has been known for some time that fuel cells can be extremely advantageous as power sources, particularly for certain applications, such as a primary source of power in remote areas, with limited service and maintenance facilities, etc. It is of course necessary in such instances that the power system not only be self-contained but be extremely reliable, and in the ultimate have no moving parts.

Various fuel cell systems have thus been devised in the past to accomplish these purposes, but in each case several problems have arisen respecting same. Firstly, in many such systems it has been difficult to control the cell temperatures and to remove waste products produced therein. Cell temperature control is highly significant and further if it is not accomplished with a minimum temperature gradient across the electrodes, uniform current density will not be maintainable, and degradation of the cell will occur. An associated problem has been the inability to continuously supply and distribute the reactant feeds across the electrode surfaces. This problem as well as the problem of removal of waste products each also directly relate to the problem of temperature control, depending upon the particular method employed for waste removal and/or reactant distribution.

One type of fuel cell which has been particularly designed in order to overcome these and other problems is shown and described in U.S. Pat. No. 3,709,736, assigned to the assignee of the present application. This patent describes a fuel cell system which includes a stacked configuration comprising alternating fuel cell laminates and thermally conductive impervious cell plates, the laminates comprising fuel and oxygen electrodes on either side of an electrolyte comprising an immobolized acid. The patentee in that case thus discusses how temperature control, removal of product water, and distribution of oxygen across the cathodes is achieved without the need for an external cooling system, separate coolant fluids, or other such complex devices used in the past. In addition, the use of cooling fins in connection with the cell plates as has also been employed in the past can be eliminated. In the configuration shown in U.S. Pat. No. 3,709,736 the oxidant performs the functions of waste heat removal, product water removal, and supply of oxidant to the cells.

As noted above, the system disclosed in this reference uses an electrolyte comprising an immobilized stable acid, and a typical example of such as electrolyte member is shown and described in U.S. Pat. No. 3,453,149 which utilizes a matrix consisting of a fluorocarbon polymer gel in which the acid electrolyte is entrapped. Inert solid inorganic porous particles are incorporated in the fluorocarbon polymer gel to stabilize the structure. The above noted types of fuel cells have proven to be extremely valuable.

Another type of fuel cell which has also been developed utilizes an ion exchange membrane as the electrolyte between the fuel and oxygen electrodes. For example, U.S. Pat. No. 2,913,511 assigned to General Electric Company discloses use of an ion exchange resin as the electrolyte, i.e. in the form of a membrane separating the electrodes. The configuration employed by this patentee comprises a hydrated ion exchange resin membrane between the electrodes, such that the membrane is substantially saturated with water, and includes a single pair of electrodes and a single ion exchange membrane therebetween as well as means for collecting current from the edges of the electrodes through leads 4 and 5 thereon. Subsequently however in U.S. Pat. No. 3,134,697, again assigned to the General Electric Company, an attempt was made to improve upon such cells. In particular the patentee claims that polarization of the cell can be substantially decreased by a particular combination of electrode and electrolyte structure for such ion exchange resin membrane fuel cells. In particular the patentee teaches integrally bonding and embedding the gas absorbing metal electrolyte member. The patentee teaches however that if the preferred metal powder electrode materials are employed, the electrical conductivity of the electrode is limited and the internal resistance of the cell increased. The patentee thus employs terminal grids contacting the ends of the electrodes for current collection, even in a case where bipolar electrodes are employed with series connection of cells.

A most recent development has been the attempt to employ certain newly developed ion exchange membranes in the latter type of fuel cells. This latest type of electrolyte comprises a NAFION perfluorosulfonic acid membrane recently developed by the DuPont Company. These attempts have thus included preparation of fuel cells which comprise a catalyst layer including a porous metallic collector screen on either side of the ion exchange membrane, with each such catalyst layer imbedded in a porous teflon film in order to prevent moisture from wetting the catalyst surface and thus restricting reactant access thereto. In addition, since this layer is non-conductive, it is necessary to collect the current from the edges of the individual cells in a manner similar to that shown in U.S. Pat. No. 2,913,511 discussed above.

The search has therefore continued for improved fuel cell configurations, and in particular for stacked configurations employing bipolar plates in connection with various ion exchange membranes.

SUMMARY OF THE INVENTION

In accordance with the present invention applicant has discovered a novel fuel cell assembly which permits the utilization of certain ion exchange membranes as electrolytes in such stacked fuel cell assemblies. In particular this may be accomplished by providing such a fuel cell assembly comprising a plurality of fuel cell laminates stacked together substantially parallel to each other so that each fuel cell laminate comprises a catalytic fuel electrode, a catalytic oxygen electrode, and the ion exchange membrane acting as the electrolyte member therebetween; a plurality of electrically conductive bipolar plates separating adjacent fuel cell laminates in the stacked configuration, each plate having opposite surfaces contacting electrodes of the cells in the stacked configuration, one of the surfaces contacting one of the fuel electrodes and the opposite surface contacting one of the oxygen electrodes; means for supplying fuel to the fuel electrodes comprising fuel gas flow channels on the surfaces of the bipolar plates which contact the fuel electrodes, the channels extending from one end of the plate to the opposite end thereof; and means for supplying an oxygen-containing gas to the oxygen electrodes comprising oxygen gas flow channels on the surfaces of the bipolar plates contacting the oxygen electrodes, the channels extending fron one side of the bipolar plates to the opposite side thereof, so that the fuel and oxygen gas flow channels are substantially perpendicular to each other.

In one embodiment of the present invention the ion exchange membrane employed comprises a perfluorosulfonic acid membrane, and the fuel cell assembly includes inlet and outlet manifold means for the fuel gas supplied thereto.

in another embodiment of the present invention the flow channels for both the fuel and oxygen-containing gas comprise parallel grooves in the surface of the bipolar plate facing the fuel and oxygen electrodes, respectively. In a preferred embodiment of this aspect of the present invention each of the surfaces of the bipolar plate, i.e. those contacting both the fuel and oxygen electrodes, comprises such grooves extending between the ends of the plate and between the sides of the plate, so as to provide a criss-cross surface for diffusion of the particular gas in question across the entire surface thereof.

In a preferred embodiment of the present invention the surfaces of the bipolar plate are treated in a manner so as to render those surfaces hydrophillic in nature. This may be accomplished by coating the bipolar plate with a high surface area material, such as a colloidal silica. In this embodiment it is additionally preferred that means for collecting the water thus channeled by the bipolar plate to the edges of the fuel cell assembly are also provided, such as a wick at the edges of the bipolar plates.

In another aspect of the preferred embodiment of the present invention the distance between the sides of the bipolar plate, i.e. the distance travelled by the oxygen-containing gas passing thereover, is limited and determined by the rate of diffusion of that oxygen-containing gas across the surface under ambient conditions. In this embodiment a relatively narrow fuel cell assembly is provided such that in accordance with the rate of diffusion of the oxygen-containing gas employed that gas can become distributed over the entire surface of the bipolar plate in contact with the oxygen electrode during use. Thus, in this embodiment, the diffusion path for the oxygen-containing gas will be as short as is practical.

In another embodiment of the present invention the electrodes utilized comprise electrically conductive porous supporting substrates, preferably employing a tetrafluoroethylene fluorocarbon impregnated with a combination of a carbonaceous binder material and a carbon-supported platinum group metal catalyst. In particular, the carbon is preferably a carbon black of low porosity and surface area in a particular range lower than commonly found in activated carbon chars. The construction of this electrode is carried out in a manner shown in U.S. Pat. No. 3,425,875, assigned to the assignee of the present invention, and this portion of that disclosure is incorporated herein by reference thereto.

In a preferred embodiment of the present invention the bipolar plates utilized are preferably composed of graphite, and the fuel comprises a hydrogen-containing gas while the oxygen-containing gas comprises air.

Further in accordance with the present invention applicant has also discovered a method for manufacturing fuel cell assemblies as discussed above. In particular this has now been accomplished by preparing a catalytic oxygen electrode, preparing a catalytic fuel electrode, providing an electrolyte comprising an ion exchange membrane, preparing a fuel cell laminate comprising the oxygen and fuel electrodes bonded to either side of the ion exchange membrane utilized as the electrolyte member, providing a stacked fuel cell assembly by alternating fuel cell laminates with bipolar plates, the bipolar plates having opposite surfaces contacting electrodes of the cell laminates in the stack, with one of the surfaces contacting a fuel electrode and the opposite surface contacting an oxygen electrode and the surface of the bipolar plates contacting the fuel electrode including fuel gas flow channels extending from one end of the bipolar plate to the other, and the surface of the bipolar plate contacting the oxygen electrode including oxygen-containing gas flow channels extending from one side of the bipolar plate to the other, so that the fuel and oxygen-containing gas flow channels are substantially perpendicular to each other.

In the preferred embodiment of this aspect of the invention, the fuel cell laminates are prepared by contacting the catalytic side of each electrode with the opposite surfaces of the ion exchange membrane utilized as the electrolyte, and bonding the surfaces of the electrodes to the surface of the ion exchange membrane by the application of heat and pressure thereto.

In a preferred embodiment of the method of the present invention the surfaces of the bipolar plate are treated with a material so as to render these surfaces highly hydrophillic prior to assembly, preferably a colloidal silica sol solution being used therefore.

It should also be noted that the fuel cell system and method described herein has been described as preferably utilizing a hydrogen-containing feed as the fuel and air as the oxygen-containing feed. The feed to the oxidant electrode may be any inert gas, such as nitrogen or argon, carrying the required oxidant.

DETAILED DESCRIPTION

Figure 1:
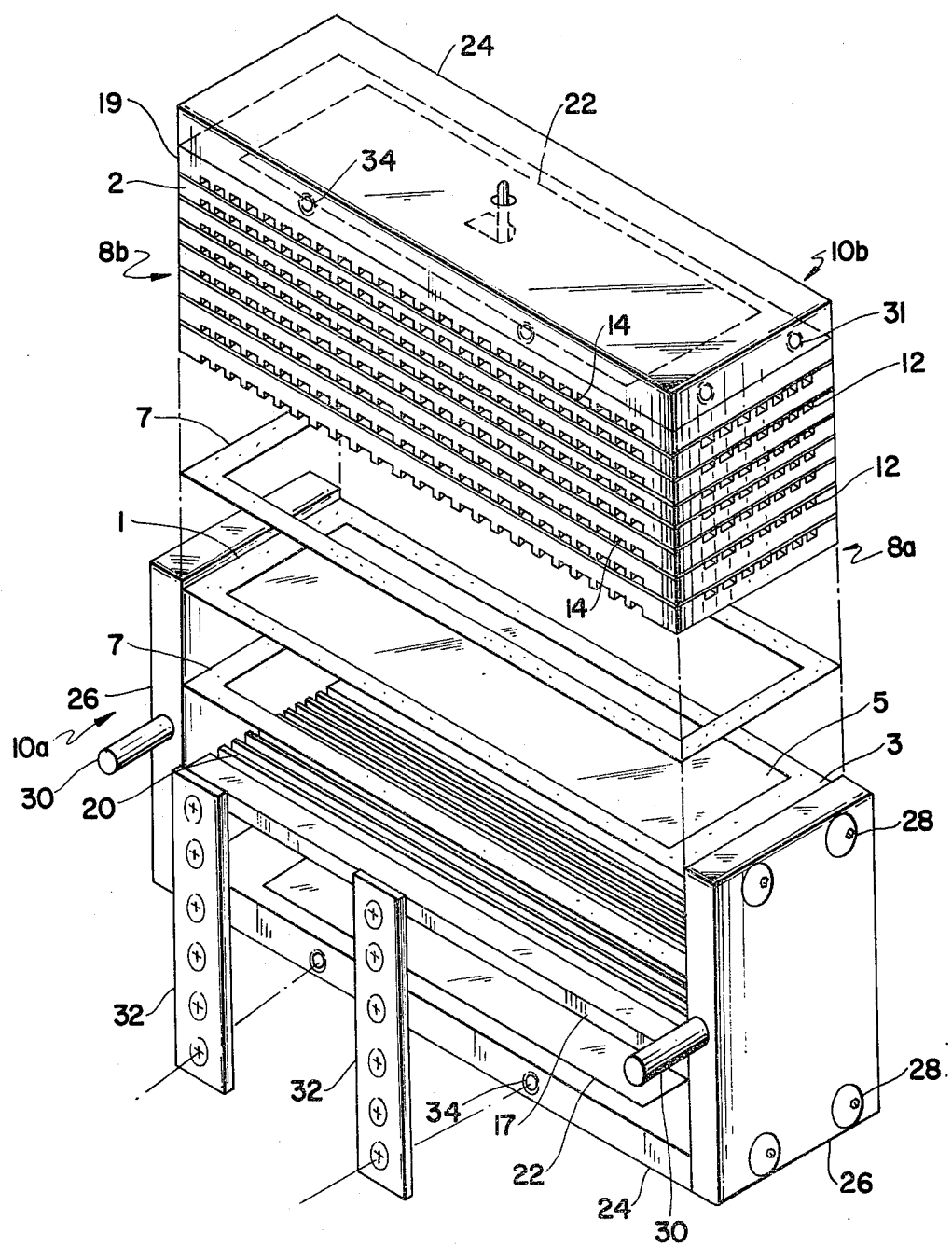
FIG. 1 is an exploded perspective view of a fuel cell assembly of the present invention.

A significant feature of the fuel cell assemblies of the present invention resides in the use of ion exchange membranes as the electrolyte therein.

Suitable ion exchange membranes are cation exchange membranes such as NAFION manufactured by DuPont. NAFION is based on perfluorosulfonic acid polymer with high chemical and thermal stability. NAFION is permeable to positive charged ions but is impermeable to negative charged ions. Within the NAFION membrane the fluorocarbon polymer is negatively charged but essentially immobile sulfonic acid. In the fuel cell assembly described in this invention, current is transported through the membrane by protons.

These electrolytes are immobilized which has the advantage that the interface between the electrode and electrolyte is invariable and not subject to change during cell operation. The water generated in the conversion of hydrogen is rejected from the membrane and can either be removed as liquid water or vaporized. This is in contrast to other fuel cell systems where considerable care has to be taken in the process of removing the product water such that a stable electrode-electrolyte interface is maintained. Water accumulation in these cells can lead to drowning of the electrode structure and loss of performance or excessive water removal can have the same effect by drying out the cell. As the electrolyte recedes contact is lost with the electrode, and performance thus diminishes.

As discussed above another significant feature of the present invention comprises the fact that the ion exchange membrane cells are employed in a stacked configuration in connection with bipolar cell plates. These conductive and gas impermeable plates are employed to separate adjacent cells in the cell stack and are in contact with the electrodes. As further discussed below these plates are manufactured from thermally conductive materials and have gas flow channels on the electrode contacting surfaces. In selecting suitable materials for constructing these cell plates one has to take into account possible corrosion due to imposed potentials. Further, the need for electrical and thermal conductivity as well as the cost of that material and the cost of fabrication must be considered. these requirements are met by a number of materials such as titanium, niobium, tantalum and alloys such as hastalloy. In accordance with the present invention it is preferable however to employ graphite or resin bonded graphite carbon composite materials. The ability to employ these carbon based materials eliminates several problems and particularly simplifies the fabrication of the channeled structure, and molding or extrusion fabrication molds can be used for that purpose. As further noted above, all of this may be accomplished in connection with the present invention in a system employing no moving parts for effecting the flow of oxidant gas across the bipolar plates.

The channeling means employed for both the fuel and oxidant gas includes grooves cut into the surfaces of the bipolar plates. Thus a plurality of parallel grooves running from one end of the bipolar plate to the other on the surface thereof in contact with the fuel electrode is employed, while a plurality of parallel grooves extending from one side of the bipolar plate to the other side thereof (i.e. across the narrow width of the rectangular configuration thereof) on the surface of the bipolar plate in contact with the oxidant electrode is also employed. In a preferred embodiment however both surfaces of the bipolar plate will include grooves extending from both the ends of the plate and the sides of the plate so as to form a criss-cross pattern thereon. This provides for more uniform distribution of fuel and oxidant gas over the surface of the electrodes, particularly if the grooves are partially blocked by an accumulation of water.

Another significant aspect of the present invention is the treatment of the bipolar plates so that the surfaces thereof become hydrophillic. As discussed above, the removal of liquid water produced during operation of the fuel cell assemblies of the present invention becomes significant since the fuel cells hereof operate at about ambient temperatures, and the water formed may not fully vaporize. Furthermore, the water is rejected by the hydrophobic electrodes and must be removed from this environment in order to permit the cell to continue to operate. The removal of this water is accomplished in accordance with this invention by treating the surfaces of the bipolar plates, including the grooves discussed above, so as to render them hydrophillic. This is accomplished by employing high surface area materials, or wetting agents, preferably materials such as colloidal silica sols, and most preferably a material designated LUDOX and sold under that trademark by the DuPont Corporation. The plates can also be coated with suspensions of high surface area alumina or silica-alumina.

The other major element required in accordance with the present fuel cell assemblies are the electrodes themselves, and in this case the particular method of preparing the fuel cell laminates, i.e. including a pair of electrodes on either side of the ion exchange membrane used as the electrolyte.

The electrodes used in connection with this invention comprises a thin porous supporting substrate, and bonded to the supporting substrate and on the surfaces of pores thereof a mixture of a carbonaceous binder material and a carbon-supported platinum group metal as catalyst. The substrate upon which the catalyst is deposited is a highly porous sheet of carbon fibers which is typically 0.01 to 0.01 inches thick. This structure is preferably impregnated with a dilute teflon emulsion and heated to about 325° C. This renders it water repellent. Water generated in the catalyst layer during cell operation is forced through this water repellent structure without flooding its pores. As a result access of the reactant gases to the catalyst is not restricted.

The specific configuration of the fuel cell assembly of the present invention as well as the method of its manufacture may be more fully understood by reference to the drawings herein.

Referring to the drawings, in which like numerals refer to like portions thereof, FIG. 1 shows an overall stacked configuration in accordance with the fuel cell assembly of the present invention, including individual fuel cell laminates 1. Each such laminate 1 (as shown more clearly in FIG. 2) including an ion exchange membrane 3 and a pair of electrodes 5 (shown in FIG. 2 as 5a and 5b, namely the fuel and oxidant electrodes, respectively). As shown in FIG. 1 each electrode 5 is placed within the area of the ion exchange membrane employed in the electrolyte, and has a surface area smaller than the latter. In this manner rectangular gaskets 7 corresponding substantially with the area of the ion exchange membrane extending beyond the edge of the electrodes 5 are employed in building up the stacked configuration in accordance with the present invention, i.e. prior to inclusion of the bipolar plates thereof.

The electrodes themselves are bonded to both surfaces of the ion exchange membrane. This is accomplished by placing the electrodes with the catalyst side facing the ion exchange membrane on either side thereof and located centrally thereon.

Bonding is then accomplished by the application of heat and pressure thereto, including a temperature of about 200 to 400° F. and a pressure of between about 500 and 2500 psi preferably about 800 psi. This may be preferably accomplished by means of a hydraulic press having heating platens.

Figure 2:
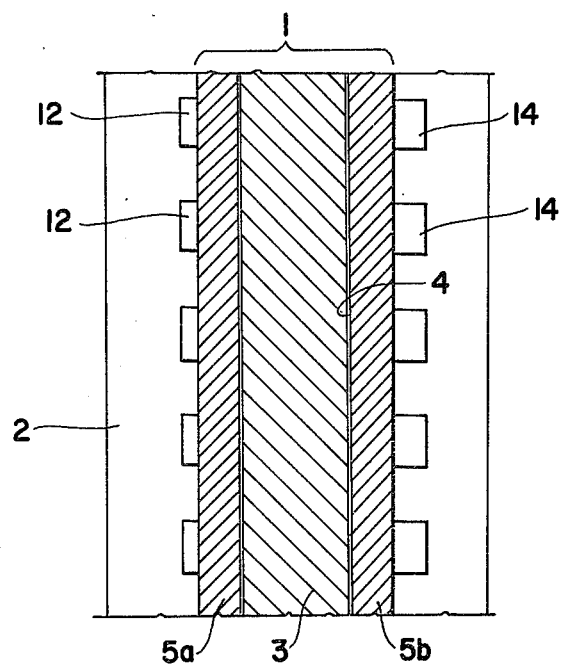
FIG. 2 is an enlarged schematic cross-sectional detail of a cell stack of the present invention.

Referring again to FIG. 1, the overall fuel cell stack includes alternating bipolar plates and cell laminates. As discussed above the bipolar plates include fuel gas flow channels extending from ends 8a to 8b of the stack, as shown at 12, and oxygen-containing gas flow channels 14 extending from one side 10a to the other side 10b of the stacked configuration. As can be seen in FIG. 2 these grooves abut the surface of the fuel and oxidant electrodes 5a and 5b, respectively, and it will further be noted that the grooves of the bipolar plate on the side facing the oxidant electrode are deeper than the grooves on the side facing the fuel electrode. For example, in a carbon bipolar plate having a thickness of 0.16 inches, the grooves on the oxidant electrode surface are about 0.06 inches wide and 0.06 inches deep, with ribs of about 0.03 inches in width, while on the fuel surface, the grooves are 0.06 inches wide and 0.03 inches deep, with ribs of again 0.03 inches in width. The purpose of the deeper grooves on the oxygen side is to provide increased cross-sectional area for reactant diffusion.

It is noted that although the gas flow channels are shown as grooves in the embodiments in FIGS. 1 and 2 it will also be appreciated that the channels can take other forms such as embossment on the plate, screens, expanded metal structures placed over the bipolar plate, etc. Also, the criss-cross pattern discussed above wherein each surface of the bipolar plates includes grooves running from end to end as well as from side to side thereof is only one of a number of configurations suitable for the plate surface, i.e. it is intended merely to distribute the reactant feeds uniformly across the electrode surface.

The fuel cell assembly or stacked configuration of the present invention thus employs a plurality of the individual cell laminates shown and described in FIGS. 1 and 2 bolted together externally. Referring again to FIG. 1 the stack includes an anode termination plate 17 at one end of the plurality of cell laminates and a cathode termination plate 19 at the other. These termination plates are simply equivalent to bipolar plates which however only include one surface which is in contact with an electrode. Thus in connection with anode termination plate 17 the inner surface thereof includes grooves 20 for contact with the fuel electrode, the other side of the anode termination plate being substantially flat, while the cathode termination plate 19 similarly only includes grooves extending across the surface of the same from one side 10a to the other side 10b of the fuel cell, for distribution of the oxygen-containing gas thereacross on to the surface of the oxidant electrode, again the other side of this plate being substantially smooth.

On these substantially smooth sides of both the anode and cathode termination plates are provided current collectors 22, generally comprising a metal which assures low contact resistance with the carbon plate, such as copper, or plated copper foil or, for instance, silver copper plated foil. The cells are then completed by the inclusion of cover plates 24 at either end thereof. The entire fuel cell may then be firmly bolted together as a single unit by means of the fuel manifold covers 26 at either end of the stack, i.e. by compressing the stack and employing screws 28 which are applied to corresponding holes 31 on the ends of either side of the cover plates.

The fuel manifolds themselves include a fuel inlet and outlet tube 30. The latter may be blocked, however, if the fuel cell is operated with pure hydrogen as the fuel, and the accumulation of inert gases is consequently small.

Figure 4:
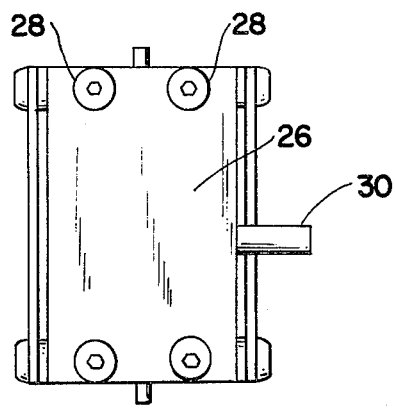
FIG. 4 is an end perspective view of a completed fuel cell assembly of the present invention.
Figure 5:
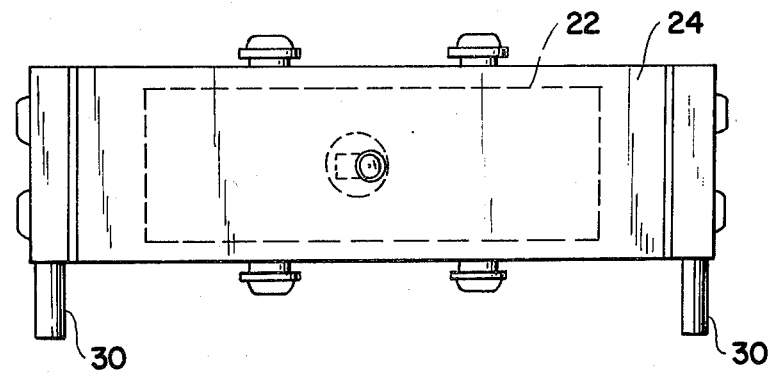
FIG. 5 is a side perspective view of a completed fuel cell assembly of the present invention.

The assembly is further finally completed by the application of tension straps 32 on the sides of the fuel cell again attached to the upper and lower cover plates 24 by means of screws inserted through the tension straps into holes 34 on the sides of the cover plates. The final configurations can again be seen in FIG. 3, 4 and 5 thereof.

Figure 3:
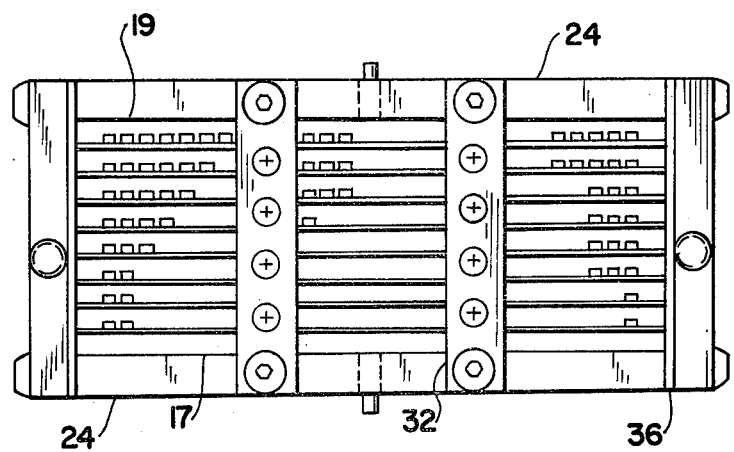
FIG. 3 is a side perspective view of a completed fuel cell assembly of the present invention.

It should also be noted as can be seen best in FIG. 3 that a fuel manifold gasket 36, having an open rectangular configuration, is included between the side of the stacked configuration and the fuel manifold 26 to permit manifolding of the fuel inlet 30 within the manifold 26 and finally into the openings 12 at the ends of the bipolar plates themselves.

As can further be seen with reference to FIG. 1 the oxygen-containing gas merely enters through port 14 along the sides of the fuel cell stack by diffusion, the driving force being the concentration gradient which develops as oxygen is consumed in the stack by the electrochemical reaction. In this manner the use of additional means for impelling the oxygen-containing gas through the grooves in the bipolar plate is eliminated and no moving parts are required to perform this function. As again noted previously the width of the bipolar plates, i.e. from side 10a to side 10b thereof, is therefore limited by the diffusion characteristics of the oxygen containing gas employed. Thus in that case the width will be from between about 0.5 inches to about 5 inches, preferably about 2 inches so that the air can diffuse entirely across the surface of the plate in contact with the oxygen electrode. These dimensional restrictions do not apply if pure oxygen or enriched oxygen or enriched air is used. In those cases a pressure differential will develop as oxygen is consumed in the cells, providing a developing force for oxygen transport to the stack. For example, for operation with oxygen a stack has been used which has the same general features of construction as that shown in FIG. 1, however the cell dimensions are 10 by 10 inches in order to assure removal of product water from the stack, and it is preferably operated in a vertical position so that the water can accumulate by gravity on one end and be removed by a wick.

What is claimed is:

1. A fuel cell assembly comprising a plurality of fuel cell laminates stacked together in substantially parallel relationship to each other, each fuel cell laminate comprising a catalytic fuel electrode to which a fuel is fed;

a catalytic oxygen electrode to which an oxygen-containing gas is fed;

an ion exchange membrane as an electrolyte member between and in contact with the fuel and oxygen electrodes;

a plurality of electrically conductive bipolar plates separating adjacent fuel cell laminates in the stack, each of said bipolar plates having opposite surfaces contacting electrodes of the cells in the stack, one surface contacting a fuel electrode and the opposite surface contacting an oxygen electrode;

means for supplying fuel to said electrodes comprising a plurality of separate fuel gas flow channels on a surface of each bipolar plate contacting a fuel electrode, said means for supplying fuel extending from one edge of a bipolar plate to the opposite edge of the plate; and means for supplying an oxygen-containing gas to each oxygen electrode, comprising a plurality of separate oxygen-containing gas flow channels on the surface of each bipolar plate in contact with the oxygen containing electrode, said oxygen-containing gas supply means extending from one edge of each bipolar plate to said opposite edge, the oxygen gas flow channel generally having a larger cross sectional area compared with fuel gas flow channels while arranged along parallel planes in perpendicular pathways.

2. The fuel cell assembly of claim 1 including fuel manifolding means at either end of said fuel cell assembly for distribution of fuel to said fuel supply means at one end of said bipolar plates.

3. The fuel cell assembly of claim 1 in which both said fuel supply means and said oxygen-containing gas supply means comprise grooves extending across the surfaces of said bipolar plates.

4. The fuel cell assembly of claim 1 wherein the surfaces of said bipolar plates are hydrophillic.

5. The fuel cell assembly of claim 4 in which said surfaces of said bipolar plates are rendered hydrophillic by coating with a high surface area composition.

6. The fuel cell assembly of claim 5 wherein said high surface area composition comprises a colloidal silica sol.

7. The fuel cell assembly of claim 1 including means for collecting water produced in said fuel cell laminate.

8. The fuel cell assembly of claim 7 wherein said means fr collecting water comprises wick means associated with the edges of said fuel cell laminates.

9. The fuel cell assembly of claim 1 in which the distance from one side of said bipolar plates to said opposite side of said bipolar plates defining the length of said oxygen-containing gas supply means is sufficiently short to permit said oxygen containing gas to diffuse across the entire surface thereof under ambient conditions.

10. The fuel cell assembly of claim 9 wherein said distance is from between about 0.5 to 5 inches.

11. The fuel cell assembly of claim 3 wherein both surfaces of said bipolar plates includes said grooves extending between both ends and both sides of said bipolar plates so as to form a criss-cross pattern on both of said surfaces thereof.

12. The fuel cell assembly of claim 1 wherein said electrodes comprise a tetrafluoroethylene fluorocarbon impregnated with a combination of a carbonaceous binder material on a carbon-supported platinum group metal catalyst.

13. The fuel assembly of claim 1 wherein said bipolar plates comprise graphite.

14. The fuel cell assembly of claim 1 wherein said bipolar plates comprise a carbon composite.

15. The fuel cell assembly of claim 1 including an anode termination plate at the end of said plurality of fuel cell laminates containing a fuel electrode, and a cathode termination plate at the end of said plurality of fuel cell laminates containing an oxygen electrode.

16. The fuel cell assembly of claim 1 wherein said anode termination plate includes said fuel supply means, and wherein said cathode termination plate includes said oxygen-containing gas supply means.

17. The fuel cell assembly of claim 16 including a pair of current collector plates at either end of said fuel cell assembly, said collector plates being in contact with said anode termination plate and said cathode termination plate, and adapted for collecting current produced in said fuel cell laminates, said current collector plates being substantially parallel to said fuel cell laminates.

18. The fuel cell assembly of claim 1 including a plurality of rectangular gasket means between said plurality of fuel cell laminates, said gasket means substantially contacting only said ion exchange membrane employed as said electrolyte.

19. The fuel cell assembly of claim 1 wherein said ion exchange membrane comprises a perfluorosulphonic acid cation exchange membrane.

20. The fuel cell assembly of claim 19 wherein the perfluorosulphonic acid is a negatively charged membrane containing essentially immobile sulfonic acid within the membrane.

21. The fuel cell assembly of claim 1 wherein the means for supplying fuel, and the bipolar plates are compatible with utilization of a hydrogen containing gas;

22. The fuel cell assembly of claim 1 wherein the dimensions and diffusibility of the bipolar plates are compatible with the use of air as an oxygen-containing gas.

23. A method of manufacturing a fuel cell assembly comprising the steps of providing a plurality of catalytic fuel electrodes, providing a plurality of catalytic oxygen electrodes, providing a plurality of electrolytes comprising ion exchange membranes, preparing a plurality of fuel cell laminates by bonding a catalytic fuel electrode and a catalytic oxygen electrode to each side of said electrolyte, preparing a stacked fuel cell assembly by stacking said plurality of fuel cell laminates alternatingly with a plurality of bipolar plates, said bipolar plates including means for supplying fuel to said catalytic fuel electrodes in contact with one surface thereof, said fuel supply means comprising fuel gas flow channels extending from one end of said bipolar plate to the opposite end of said bipolar plates, and said bipolar plates further including means for supplying oxygen to said catalytic oxygen electrode in contact with the other surface thereof, said oxygen supply means comprising oxygen-containing gas flow channels extending from one side of said bipolar plates to the opposite side of said bipolar plates, so that said fuel gas flow channels and said oxygen-containing gas flow channels are substantially perpendicular to each other but of unequal cross-sectional area favoring the oxygen-containing channels.

24. The method of claim 23 including bonding said catalytic fuel electrodes and said catalytic oxygen electrodes substantially to the central portion of said electrolytes, said electrolytes being larger than said electrodes so that said electrodes are contained entirely within the surface area of said electrolytes, leaving a portion of the area of said electrolytes uncovered by said electrodes.

25. The method of claim 24 including providing gasket means between said fuel cell laminates and said bipolar plates, said gasket means substantially conforming to the portion of said electrolytes uncovered by said electrodes.

26. The method of claim 23 including treating the surfaces of said bipolar plates with a high surface area wetting agent so as to render those surfaces hydrophillic.

27. The method of claim 26 wherein said wetting agent comprises a colloidal silica sol.

28. The method of claim 23 wherein said electrodes are bonded to said electrolytes by the application of heat and pressure thereto.

29. The method of claim 28 wherein said temperature comprises a temperature of between about 200 and 400° F., and said pressure comprises a pressure of between about 500 and b 2,500 psi.

30. The method of claim 23 including providing an anode termination plate at the end of said stacked configuration containing a catalytic fuel electrode, and providing a cathode termination plate at the end of said stacked configuration combining a catalytic oxygen electrode.

31. The method of claim 30 wherein said surface of said anode termination plate in contact with said catalytic fuel electrode includes said cathode termination plate, i.e. contact with said catalytic oxygen electrode includes said oxygen-containing gas flow channels.

32. The method of claim 20 including providing current collector plates at either end of said fuel cell assembly in contact with said anode and cathode termination plates, said current collector plates being conductive so as to collect current generated in said fuel cell assembly.

* * * * *